US 6,676,289 B2

(12) United States Patent
Hirano et al.

(10) Patent No.: US 6,676,289 B2
(45) Date of Patent: Jan. 13, 2004

(54) TEMPERATURE MEASURING METHOD IN PATTERN DRAWING APPARATUS

(75) Inventors: Ryoichi Hirano, Yokohama (JP); Shusuke Yoshitake, Numazu (JP); Toru Tojo, Kanagawa-ken (JP); Shuichiro Fukutome, Numazu (JP); Teruaki Yamamoto, Fuji (JP); Masaki Toriumi, Yokohama (JP)

(73) Assignees: Kabushiki Kaisha Toshiba, Tokyo (JP); Toshiba Kikai Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/933,719

(22) Filed: Aug. 22, 2001

(65) Prior Publication Data
US 2002/0027945 A1 Mar. 7, 2002

(30) Foreign Application Priority Data
Aug. 22, 2000 (JP) ........................ 2000-250848

(51) Int. Cl.[7] .................. G01K 13/00; G01K 1/14; G01K 3/00
(52) U.S. Cl. ........................ 374/141; 374/102
(58) Field of Search ................ 374/141, 102, 374/137

(56) References Cited

U.S. PATENT DOCUMENTS

| | | | | | |
|---|---|---|---|---|---|
| 4,278,380 A | * | 7/1981 | Guarino | ........... | 414/217 |
| 4,878,177 A | * | 10/1989 | Ikenaga et al. | ........... | 364/489 |
| 4,890,245 A | * | 12/1989 | Yomoto et al. | ........... | 702/135 |
| 4,929,090 A | * | 5/1990 | Grahm | ........... | 374/102 |
| 4,972,099 A | * | 11/1990 | Amano et al. | ........... | 374/102 |
| 4,996,434 A | * | 2/1991 | Tanaka | ........... | 250/492.3 |
| 5,281,025 A | * | 1/1994 | Cali et al. | ........... | 374/141 |
| 5,436,172 A | * | 7/1995 | Moslehi | ........... | 374/121 |
| 5,775,808 A | * | 7/1998 | Pan | ........... | 374/161 |
| 6,022,672 A | * | 2/2000 | Ikeda | ........... | 430/325 |
| 6,090,176 A | * | 7/2000 | Yoshitake et al. | ........... | 55/385.4 |
| 6,091,255 A | * | 7/2000 | Godfrey | ........... | 324/760 |
| 6,190,037 B1 | * | 2/2001 | Das et al. | ........... | 374/121 |
| 6,203,969 B1 | * | 3/2001 | Ueda | ........... | 430/330 |
| 6,265,723 B1 | * | 7/2001 | Morita | ........... | 250/515.1 |
| 6,411,916 B1 | * | 6/2002 | Pellerin | ........... | 702/130 |
| 6,488,778 B1 | * | 12/2002 | Ballantine et al. | ........... | 118/719 |
| 6,507,007 B2 | * | 1/2003 | Van Bilsen | ........... | 374/102 |
| 6,537,012 B2 | * | 3/2003 | Kawahara et al. | ........... | 414/217 |

(List continued on next page.)

FOREIGN PATENT DOCUMENTS

| | | | | |
|---|---|---|---|---|
| DE | 4228484 A1 | * | 3/1994 | ........... 374/141 |
| JP | 54121793 A | * | 9/1979 | ........... 374/102 |
| JP | 05010826 A | * | 1/1993 | ........... 374/141 |
| JP | 05149795 A | * | 6/1993 | ........... 374/141 |
| JP | 06066643 A | * | 3/1994 | ........... 374/141 |
| JP | 06275674 A | * | 9/1994 | ........... H01L/21/60 |
| JP | 2002110515 A | * | 4/2002 | ........... H01L/21/27 |

Primary Examiner—Diego Gutierrez
Assistant Examiner—Mirellys Jagan
(74) Attorney, Agent, or Firm—Finnegan, Henderson, Farabow, Garrett & Dunner, LLP

(57) ABSTRACT

According to one embodiment of the present invention, the present invention may provide a temperature measuring method in a pattern drawing apparatus having a drawing chamber for drawing a pattern on a substrate to be transferred inside, a stage installed inside the drawing chamber, a standby chamber connected to the drawing chamber, and a thermostatic device installed inside the standby chamber, characterized in that a dummy substrate having a temperature measuring device and a recording device for recording the temperature measured by the temperature measuring device is transferred to the thermostatic device, then transferred into the drawing chamber, and then put on the stage, thus the temperature history of the dummy substrate in the transfer route from the thermostatic device to the stage is measured by the temperature measuring device and recorded in the recording device.

2 Claims, 5 Drawing Sheets

U.S. PATENT DOCUMENTS

| | | | |
|---|---|---|---|
| 2001/0016938 A1 * | 8/2001 | Nishiyama et al. | 716/21 |
| 2001/0026576 A1 * | 10/2001 | Beer et al. | 374/141 |
| 2001/0037856 A1 * | 11/2001 | Park | 156/345 |
| 2002/0017247 A1 * | 2/2002 | Sakai et al. | 118/730 |
| 2002/0070345 A1 * | 6/2002 | Mizuochi et al. | 250/396 H |
| 2002/0084261 A1 * | 7/2002 | Yamakazi | 219/390 |
| 2002/0106830 A1 * | 8/2002 | Ohmi et al. | 438/69 |
| 2002/0135488 A1 * | 9/2002 | Hibbs et al. | 340/584 |
| 2003/0053893 A1 * | 3/2003 | Matsunaga et al. | 414/217 |

* cited by examiner

Fig. 3
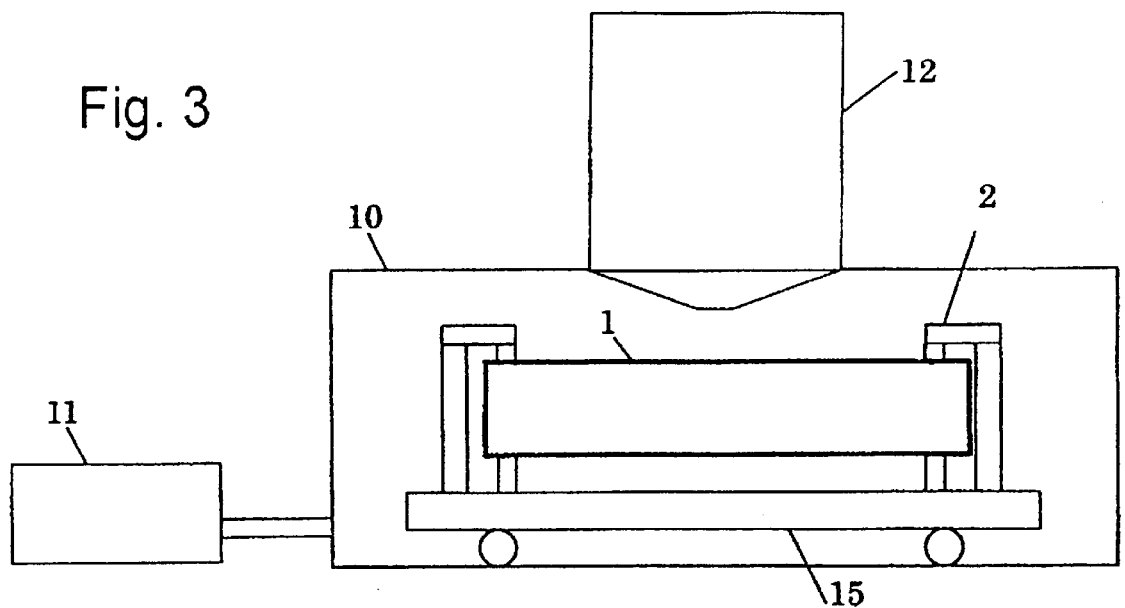
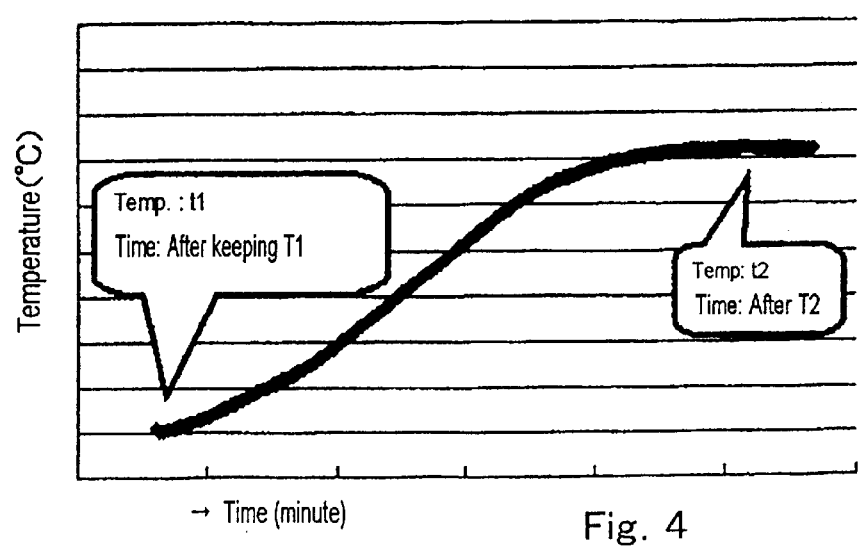
Fig. 4

TEMPERATURE MEASURING METHOD IN PATTERN DRAWING APPARATUS

CROSS-REFERENCE TO RELATED APPLICATIONS

This application is based on the benefit of the priority of Japanese Patent Application 2000-250848 filed on Aug. 22, 2000. The entire contents of the application in Japan are quoted here and incorporated in this application.

BACKGROUND OF THE INVENTION (1) Field of the Invention

The present invention relates to a temperature measuring method in a pattern drawing apparatus.

(2) Description of the Related Art

Due to high integration and high capacity of LSIs in recent years, the circuit line width required for semiconductor devices is refined more and more.

In these semiconductor devices, conventionally, a desired circuit pattern is prepared by positioning several tens kinds of original drawing patterns (called a reticle or a mask) in the exposure area on a semiconductor wafer with high precision and transfer them. This semiconductor wafer steps and repeats for the optical system, so that the transfer device is called a stepper.

In this semiconductor process, the original drawing pattern forming method uses a substrate with a resist uniformly coated on a glass substrate with Cr deposited on one side thereof, irradiates an electron beam onto the substrate, and scans beam spots according to the pattern design data. The resist on the part with an electron beam irradiated is used as a mask by development, and the lower layer of Cr is etched, and the resist is removed, thus a desired pattern is formed.

When a pattern is to be drawn on a glass substrate like this, if the temperature of the glass substrate is changed during drawing, the glass substrate is expanded or shrunk. During drawing, the glass substrate is fixed on the drawing stage controlled accurately by a laser interference meter and the part of the glass substrate where the pattern is to be drawn is controlled by the measured value of the laser interference meter. Therefore, when the glass substrate is expanded or shrunk during drawing, a pattern position error is caused. For example, the coefficient $\alpha$ of linear expansion of the glass substrate composed of synthetic quartz is $0.4 \times 10^{-6}$, so that when the temperature of the glass substrate is changed by 1° C. during drawing, the distance of 130 mm between 2 points on the glass substrate is changed by 130 mm$\times\alpha$=52 nm and it is a large value as an error of the pattern position. Consequently, when the temperature before the glass substrate is transferred onto the stage is low, the change in temperature during drawing is increased and the error of the pattern position becomes more remarkable.

To avoid the aforementioned problem, temperature-controlled isothermal water is let pass in the neighborhood of the route for transferring the glass substrate so as to stabilize the temperature. For temperature control, it is necessary to install thermometers at the main parts in the substrate transfer route and monitor whether constant temperature is kept.

However, the thermometer always has a certain amount of variation in measured values (absolute value ±0.15° C. in Class 1 of JIS) for the absolute temperature. Therefore, to set the transfer route at a uniform temperature, it is necessary to calibrate the individual difference of each thermometer. However, to execute temperature calibration, it is necessary to prepare an absolute standard of temperature and adjust all several tens of thermometers, so that adjustment requires much labor.

Further, the thermometers must be installed at locations free of obstruction of transfer of the glass substrate and installed on the stage or in the chamber away from the substrate during drawing, thus a problem arises that it is difficult to measure accurately the temperature of the actual substrate itself.

After all, in a pattern drawing apparatus which cannot measure the temperature accurately like this, it is difficult to form a highly precise pattern on the glass substrate.

BRIEF SUMMARY OF THE INVENTION

The present invention was created in view of the foregoing problem and is intended to provide a temperature measuring method for accurately measuring the substrate temperature during transfer and the substrate temperature during drawing in a pattern drawing apparatus.

To accomplish the above object, the present invention may provide a temperature measuring method in a pattern drawing apparatus having a drawing chamber for drawing a pattern on a substrate to be transferred inside, a stage installed inside the drawing chamber, a standby chamber connected to the drawing chamber, and a thermostatic device installed inside the standby chamber, characterized in that a dummy substrate having a temperature measuring device and a recording device for recording the temperature measured by the temperature measuring device is transferred to the thermostatic device, then transferred into the drawing chamber, and then put on the stage, thus the temperature history of the dummy substrate in the transfer route from the thermostatic device to the stage is measured by the temperature measuring device and recorded in the recording device.

Further, the present invention may provide a temperature measuring method in a pattern drawing apparatus having a drawing chamber for drawing a pattern on a substrate to be transferred inside, a stage installed inside the drawing chamber, a standby chamber connected to the drawing chamber, and a thermostatic device installed inside the standby chamber, characterized in that a dummy substrate having a temperature measuring device and an oscillator for converting and outputting the temperature measured by the temperature measuring device to electromagnetic waves is transferred to the thermostatic device, then transferred into the drawing chamber, and then put on the stage, thus the temperature history of the dummy substrate in the transfer route from the thermostatic device to the stage is measured by the temperature measuring device and the measured temperature is sent from the oscillator and received and detected outside the drawing chamber.

Further, the present invention may provide a temperature measuring method in a pattern drawing apparatus having a drawing chamber for drawing a pattern on a substrate to be transferred inside, a stage installed inside the drawing chamber, a standby chamber connected to the drawing chamber, and a thermostatic device installed inside the standby chamber, characterized in that a dummy substrate having a temperature measuring device and a terminal connected to the temperature measuring device is transferred to the thermostatic device, then transferred into the drawing chamber, and then put on the stage, thus the temperature history of the dummy substrate in the transfer route from the thermostatic device to the stage is measured by the temperature measuring device and detected from the terminal of the dummy substrate via the connection part installed in the transfer route.

Further, the present invention may provide a temperature measuring method in a pattern drawing apparatus having a drawing chamber for drawing a pattern on a substrate to be transferred inside, a stage installed inside the drawing chamber, a standby chamber connected to the drawing chamber, and a thermostatic device installed inside the standby chamber, characterized in that a dummy substrate having a temperature measuring device and a terminal connected to the temperature measuring device is transferred onto the stage, and the connection means installed on the stage and the terminal installed on the dummy substrate are connected, and the temperature of the dummy substrate installed on the stage is detected.

Further, the present invention may provide a temperature measuring method in a pattern drawing apparatus having a drawing chamber for drawing a pattern on a substrate to be transferred inside, a stage installed inside the drawing chamber, a standby chamber connected to the drawing chamber, and a thermostatic device installed inside the standby chamber, comprising a step of transferring a dummy substrate, in a similar shape to that of the substrate, having at least a temperature measuring device for measuring the temperature of a place where it is installed into the thermostatic device, a step of transferring the dummy substrate, transferred into the thermostatic device, into the drawing chamber, and an installation step of transferring the dummy substrate transferred in the drawing chamber and installing it on the stage, characterized in that by a temperature detection device receiving the measured temperature from the temperature measuring device, the temperature history when the dummy substrate passes through the transfer route from the thermostatic device to the stage is detected.

In the embodiment of the present invention, a thermometer is set in a dummy substrate having practically the same shape as that of a mask substrate for forming an original drawing pattern for exposing a semiconductor device pattern, and the dummy substrate is transferred into the drawing chamber under the same condition as that of transferring an actual mask substrate, and the temperature history in the drawing device is measured.

By doing this, a temperature change of an actual mask substrate can be measured, and the temperature control of the drawing device, thermostatic device, and load lock chamber is adjusted as necessary on the basis of the temperature history data of the dummy substrate, or the pattern exposure condition is adjusted, thus a highly precise pattern mask free of misalignment can be manufactured.

BRIEF DESCRIPTION OF THE DRAWINGS

FIG. 3 is a schematic view of the cross section of a highly precise pattern drawing apparatus used in the embodiments of the present invention.

FIG. 4 is a drawing showing of an example of results of temperature measurement in a highly precise pattern drawing apparatus relating to the first embodiment of the present invention.

DETAILED DESCRIPTION OF THE INVENTION

The embodiments of the present invention will be explained hereunder with reference to the accompanying drawings.

Embodiment 1

Figure 1:
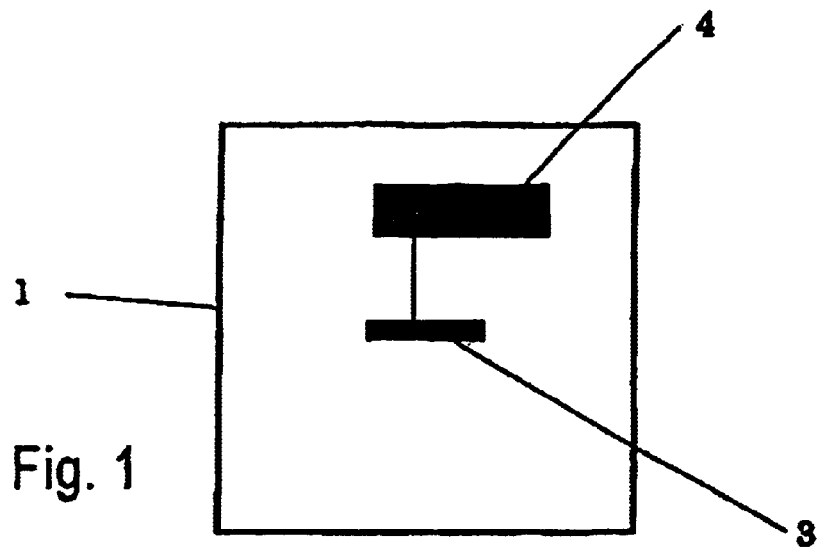
FIG. 1 is a schematic view of a dummy substrate, viewed from the top, used for temperature measurement in a highly precise pattern drawing apparatus relating to the first embodiment of the present invention.

FIG. 1 is a schematic view of a dummy substrate, viewed from the top, used for the temperature measurement method in a highly precise pattern drawing apparatus relating to the first embodiment of the present invention.

Numeral 1 indicates a glass substrate processed in a similar form to that of a mask substrate to be actually prepared. Numeral 3 indicates a thermometer composed of a platinum resistor and a thermocouple and numeral 4 indicates a storage device such as a semiconductor memory having a built-in microcomputer. The thermometer 3 is installed on the surface of the glass substrate 1 and electrically connected to the storage device 4 embedded in the glass substrate 1. When the thermometer 3 is composed of a platinum resistor and a thermocouple, the temperature is measured as a potential difference, so that it is stored in the storage device 4 via a voltmeter.

Figure 2:
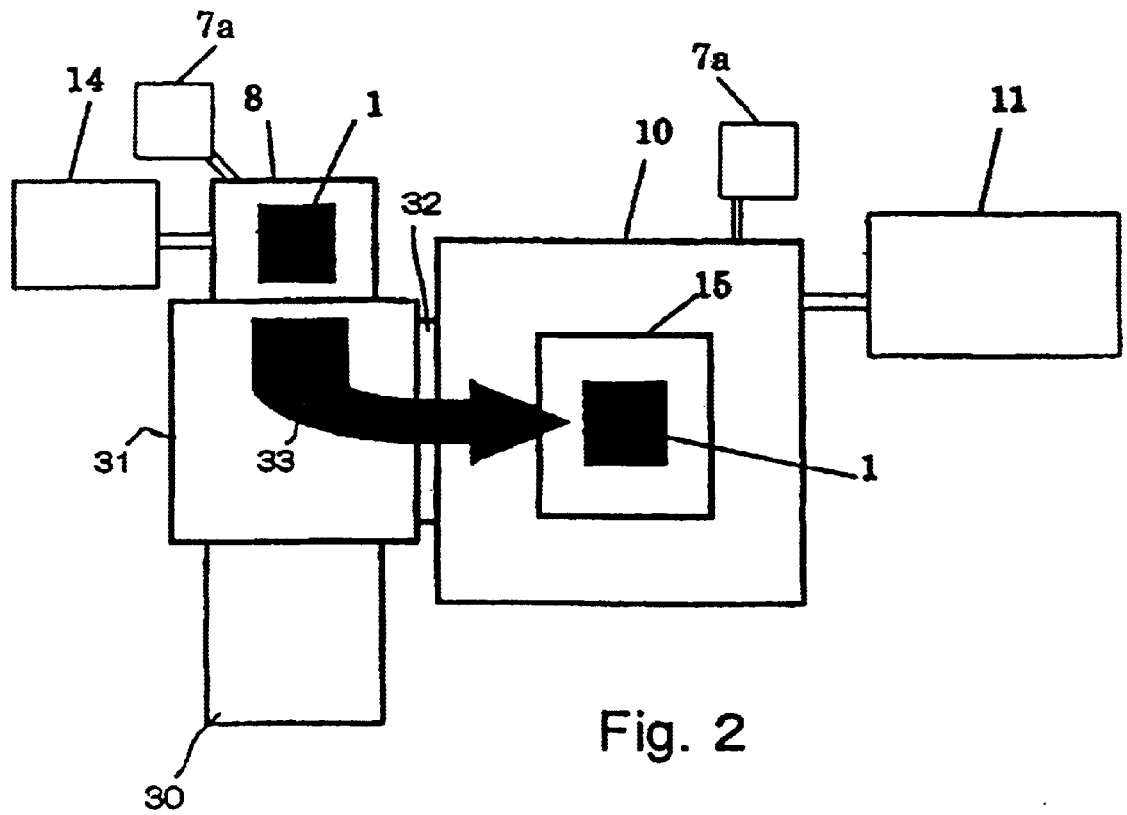
FIG. 2 is a schematic view of a highly precise pattern drawing apparatus, viewed from the top, used in the embodiments of the present invention.

FIG. 2 is a schematic view of a highly precise pattern drawing apparatus, viewed from the top, used in the embodiments of the present invention.

In a drawing chamber 10 of the drawing apparatus, an XY stage 15 is arranged. The drawing chamber 10 is connected to a robot chamber 31 via a gate valve. The robot chamber 31 is connected to a drawing standby chamber 8 having a built-in thermostatic device and a load lock chamber 30. A temperature controller 11 is installed in the drawing chamber 10 and controls the temperature of the drawing chamber 10 and the XY stage 15 and a temperature controller 14 is connected to the drawing standby chamber 8 and controls the temperature of the thermostatic device installed in the drawing standby chamber.

Next, a case that the dummy substrate 1 having the thermometer 1 and the recording device 4 shown in FIG. 1 is transferred into the highly precise pattern drawing apparatus arranged as mentioned above and the temperature history thereof is measured will be described.

Firstly, the dummy substrate 1 shown in FIG. 1 is arranged in the load lock chamber 30 and evacuated and the load lock chamber 30 is connected to the robot chamber 31. In this case, the robot chamber 31, the drawing standby chamber 8, and the drawing chamber 10 are exhausted beforehand.

Next, the dummy substrate 1 is transferred onto the thermostatic device installed in the drawing standby chamber 8 by the robot arm in the robot chamber 31. The thermostatic device is set at the same temperature as that of the temperature controller 11 by the temperature controller 14 so as to control it to the same temperature as that of the XY stage 15 in the drawing chamber 10. The dummy substrate 1 stands by for a given period of time in the drawing standby chamber 8 and is kept at a constant temperature.

Next, the dummy substrate 1 is transferred from the drawing standby chamber 8 by the robot arm as shown by an arrow 33 in FIG. 2 and transferred and put on the stage in the drawing chamber 10. In this case, the gate valve 32 is opened and closed.

FIG. 3 is a cross sectional view showing the state that the dummy substrate 1 is put on the XY stage 15.

As shown in FIG. 3, the dummy substrate 1 is fixed by a substrate holding device 2 on the XY stage 15. In the drawing, numeral 12 indicates an electron optical lens tube for irradiating an electron beam.

The drawing apparatus operates according to the actual drawing pattern. After end of drawing, the dummy substrate 1 is transferred by the robot arm from the drawing chamber 10 and transferred into the load lock chamber 30.

A temperature change in these series of transfer-in and transfer-out processes by the dummy substrate 1 is measured by the thermometer 3 and the measured results are recorded in the recording device 4.

An example of a change with time of the temperature of the dummy substrate 1 measured by the thermometer 3 and recorded in the recording device 4 is shown in FIG. 4.

FIG. 4 shows a change with time of the temperature of the dummy substrate 1 when the dummy substrate 1 is kept in the drawing standby chamber 8 for a time of T1 (for example, 2 hours) and then drawn.

From the measured temperature change curve shown in this drawing, the situation that the temperature slowly rises from the temperature t1 (22.39° C.) in the drawing standby chamber 8 to the temperature t2 (23.02° C.) on the stage is found.

Before the dummy substrate 1 is transferred into this apparatus like this, the set temperature of the temperature controller 11 of the XY stage 15 and that of the temperature controller 14 of the thermostatic device in the drawing standby chamber 8 are set to the same value. However, there is an error in the respective temperature sensors and when the dummy substrate 1 is actually transferred in, it is found that there is a difference in the temperature received by the dummy substrate 1 itself in the route.

If the mask substrate is drawn without a preliminary temperature inspection, expansion or shrinking due to the temperature difference is caused between installation on the XY stage 15 and end of drawing and no highly precise pattern can be drawn.

In this embodiment, from the temperature measured result of the dummy substrate 1 shown in FIG. 4, it is judged that the set temperature of the thermostatic device in the drawing standby chamber 8 in the transfer route is low. Therefore, the set temperature of the temperature controller 14 is increased by the temperature difference $\Delta t$ between the temperature t2 of the stage and the temperature t1 of the thermostatic device.

If the drawing condition permits in this case, the set temperature of the temperature controller 11 of the XY stage 15 may be lowered by the temperature t2 of the stage and the temperature t1 of the thermostatic device.

After the temperature adjustment is performed for the temperature controllers, to check whether the temperature adjustment is performed correctly or for fine adjustment if the temperature is not suitable, it is preferable to transfer the dummy substrate 1 again and detect the temperature history.

Further, after checking finally that every temperature in the apparatus is set constant, by adjusting the temperature graduations of the temperature controller 11 of the XY stage 15 to those of the temperature controller 14 connected to the thermostatic device in the drawing standby chamber 8, the temperature of each of the thermometers can be calibrated.

When a substrate temperature change is measured by the dummy substrate beforehand like this and the temperature is corrected, at the time of drawing of an actual mask substrate, expansion and shrinking of the substrate caused by the temperature difference in the apparatus can be suppressed and a highly precise pattern can be formed.

Embodiment 2

Figure 5A:
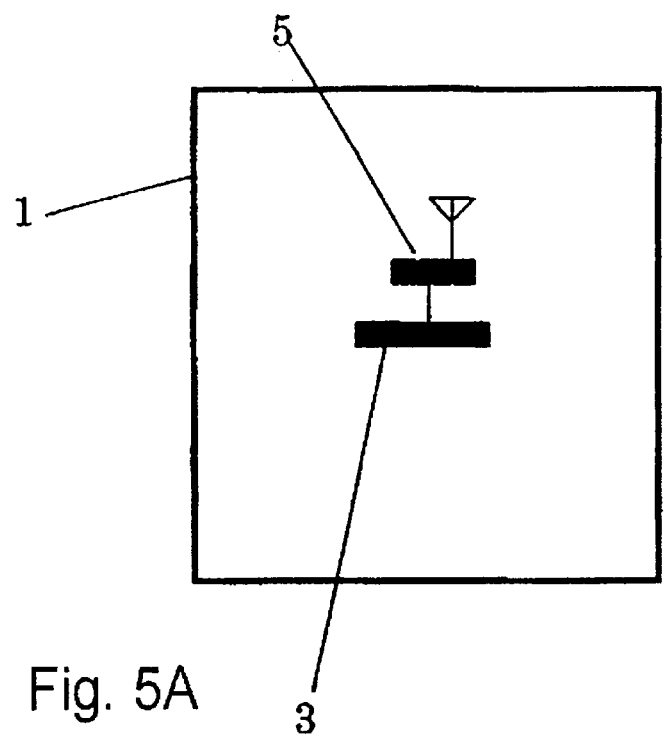
FIG. 5A is a schematic view of a dummy substrate, viewed from the top, used for temperature measurement in a highly precise pattern drawing apparatus relating to the second embodiment of the present invention.
Figure 5B:
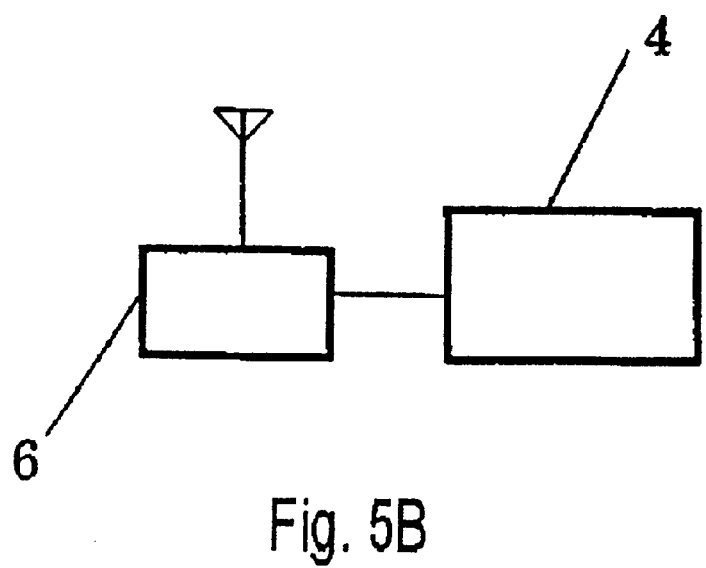
FIG. 5B is a schematic view of an external receiver and a storage device used for temperature measurement of the second embodiment.

FIG. 5A is a schematic view of a dummy substrate, viewed from the top, used for the temperature measuring method in a highly precise pattern drawing apparatus relating to the second embodiment of the present invention and FIG. 5B is a schematic view of a device for externally receiving and recording temperature data from the dummy substrate.

Numeral 1 indicates a glass substrate processed in a similar form to that of a mask substrate to be actually prepared. Numeral 3 indicates a thermometer composed of a platinum resistor and a thermocouple and numeral 5 indicates an oscillator having a built-in microcomputer.

The thermometer 3 is installed on the surface of the glass substrate 1 and electrically connected to the oscillator 5 embedded in the glass substrate 1. When the thermometer 3 is composed of a platinum resistor and a thermocouple, the temperature is measured as a potential difference, so that it is transferred to the oscillator 5 via a voltmeter and converted to electromagnetic waves.

Further, the external device shown in FIG. 5B is connected so as to receive electromagnetic waves sent by the oscillator 5 by the receiver 6 and record them in the recording device 4.

When the dummy substrate 1 of this embodiment uses the same substrate as the dummy substrate 1 of Embodiment 1, the temperature history in the transfer route can be measured.

Further, in this embodiment, the temperature history received by the dummy substrate 1 can be monitored in real time by an external device. Therefore, the temperature controller 11 of the XY stage 15 and the temperature controller 14 of the thermostatic device in the drawing standby chamber 8 can be adjusted to each other with higher precision.

Embodiment 3

Figure 6:
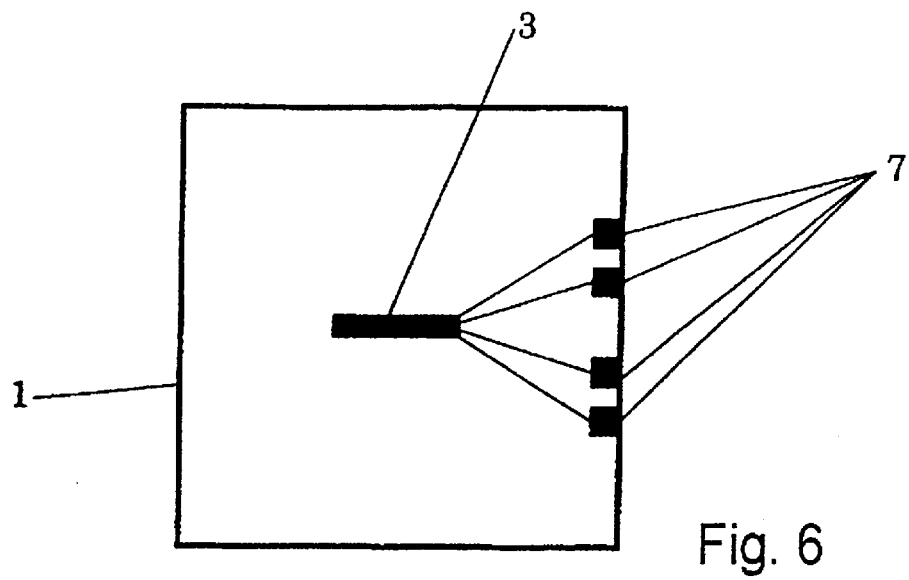
FIG. 6 is a schematic view of a dummy substrate, viewed from the top, used for temperature measurement in a highly precise pattern drawing apparatus relating to the first embodiment of the present invention.

FIG. 6 is a schematic view of a dummy substrate, viewed from the top, used for the temperature measuring method of Embodiment 3 of the present invention in a highly precise pattern drawing apparatus.

Numeral 1 indicates a glass substrate processed in a similar form to that of a mask substrate to be actually prepared. Numeral 3 indicates a thermometer composed of a platinum resistor and a thermocouple and numeral 7 indicates an output terminal connected to the thermometer 3. The thermometer 3 and the output terminal 7 are installed on the surface of the glass substrate 1.

In Embodiment 3, the terminal 7a (e.g., as schematically depicted in FIG. 2) which can be connected to the output terminal 7 of the dummy substrate 1 is arranged in the thermostatic device in the drawing standby chamber 8 shown in FIG. 2, and the measured value of the thermometer on the dummy substrate 1 can be monitored from an external device such as the temperature controller 14.

In this case, the temperature of the dummy substrate 1 while in the thermostatic device in the drawing standby chamber 8 is measured first, and the dummy substrate 1 is transferred onto the XY stage 15 by the robot arm, left on the stage until the temperature is stabilized, and then quickly returned to the drawing standby chamber 8 by the robot arm where the temperature is monitored. By doing this, the dummy substrate 1 temperature on the XY stage 15 can be measured.

To connect this output terminal 7 formed on the dummy substrate 1 to the outside, a terminal 7a (e.g., as schematically depicted in FIG. 2) can be separately installed in the transfer route. For example, when such a terminal 7a is installed on the XY stage 15, the situation of a temperature change of the dummy substrate 1 transferred from the thermostatic device in the drawing standby chamber 8 can be observed in real time.

Embodiment 4

Figure 7:
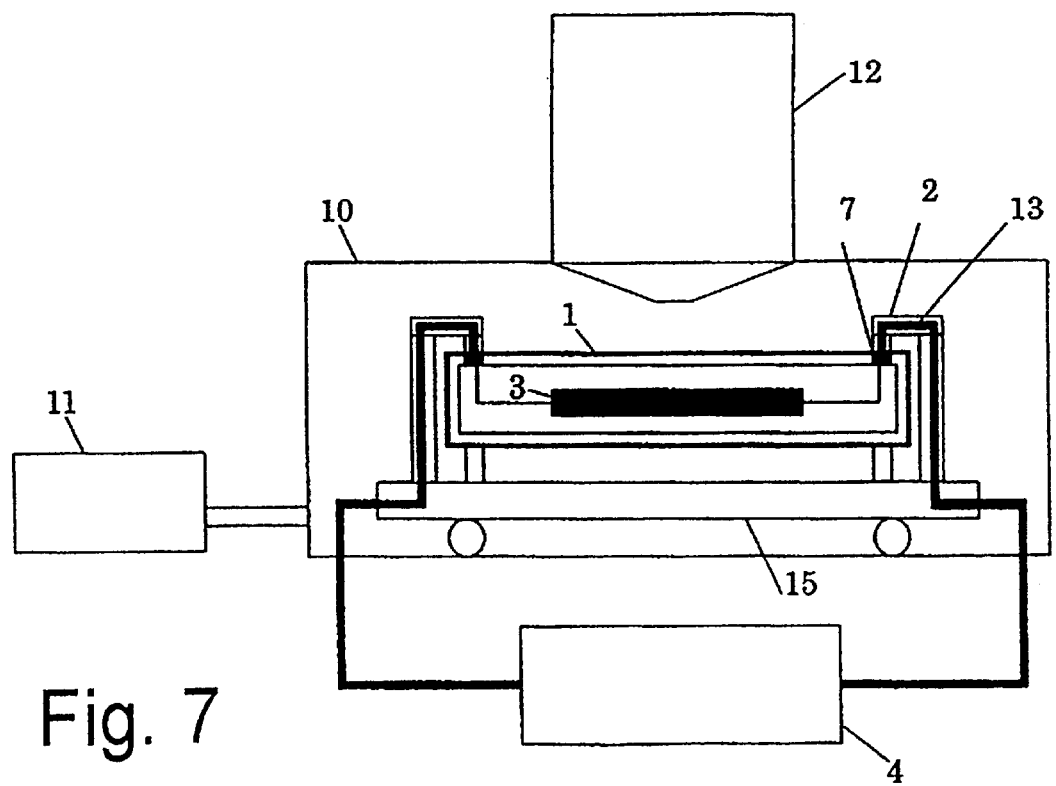
FIG. 7 is a schematic view of the cross section of a highly precise pattern drawing apparatus relating to the fourth embodiment of the present invention.

FIG. 7 is a cross sectional view showing the state that the dummy substrate 1 shown in FIG. 6 is installed on the XY stage 15. As shown in FIG. 7, the dummy substrate 1 is fixed by the substrate holding device 2 on the XY stage 15. In the drawing, numeral 12 indicates an electron optical lens tube for irradiating an electron beam.

In the substrate holding device 2, a wire 13 electrically connected to the output terminal 7 of the dummy substrate 1 is laid and connected to the external storage device 4.

When an electron beam is irradiated to the dummy substrate 1 from the electron optical lens tube 12, a temperature change of the dummy substrate 1 by beam irradiation can be measured in real time and transferred to the external storage device 4 (see, e.g., FIGS. 7 and 8) where a temperature distribution may be calculated. A temperature change varies with the condition of pattern data to be drawn, so that a temperature change is measured beforehand by desired drawing data by the dummy substrate 1.

Next, on the basis of this temperature change data, the temperature of the XY stage 15 is controlled by the temperature controller 11 so as to prevent the temperature of the dummy substrate 1 from changing. On the basis of the control data at that time, by drawing an actual mask substrate, a highly precise pattern can be formed free of changing of the substrate temperature.

Embodiment 5

Figure 8:
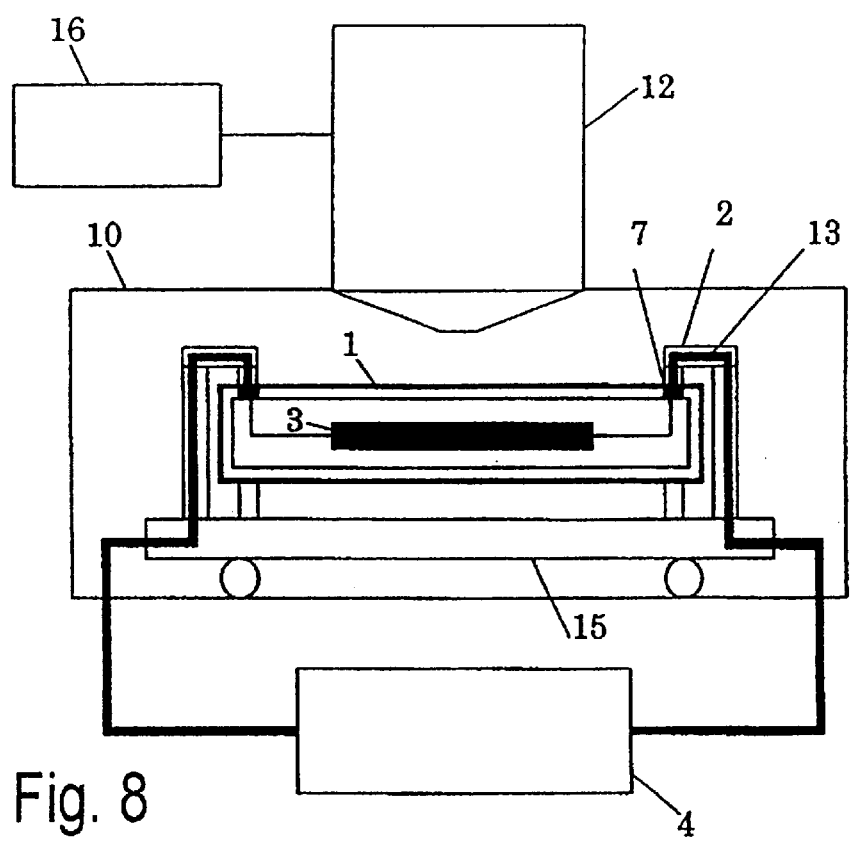
FIG. 8 is a schematic view of the cross section of a highly precise pattern drawing apparatus relating to the fifth embodiment of the present invention.

FIG. 8 is a cross sectional view showing the state that the dummy substrate 1 shown in FIG. 6 is installed on the XY stage 15. As shown in FIG. 8, the dummy substrate 1 is fixed by the substrate holding device 2 on the XY stage 15. In the drawing, numeral 12 indicates an electron optical lens tube for irradiating an electron beam. Numeral 16 indicates a drawing controller for controlling output of an electron beam and a drawing pattern.

In the substrate holding device 2, a wire 13 electrically connected to the output terminal 7 of the dummy substrate 1 is laid and connected to the external storage device 4.

When an electron beam is irradiated to the dummy substrate 1 from the electron optical lens tube 12, a temperature change of the dummy substrate 1 by beam irradiation can be measured in real time. A temperature change varies with the condition of pattern data to be drawn. Then, a temperature change when desired drawing data is drawn by the dummy substrate 1 beforehand is measured.

Next, expansion and contraction of the mask substrate are calculated on the basis of this temperature change data and input to the drawing controller 16, and a pattern is drawn in correspondence to the expansion and contraction of mask substrate when an actual mask substrate is to be drawn, thus even if the substrate temperature is changed, a highly precise pattern can be formed.

According to the temperature measuring method

What is claimed is:

1. A method of measuring temperature in a pattern drawing apparatus comprising:

a drawing chamber for drawing a pattern on a substrate;

a stage within the drawing chamber;

a standby chamber connected to the drawing chamber;

a thermostatic device within the standby chamber; and a connection part located at two places along a transfer route within the pattern drawing apparatus; the method comprising:

transferring a dummy substrate comprising a temperature measuring device and a terminal connected to the temperature measuring device into the thermostatic device;

transferring of the dummy substrate from the thermostatic device to the drawing chamber while pausing at the two places along the transfer route, the two places comprising in the thermostatic device and on the stage;

measuring the temperature of the dummy substrate at the two places using the temperature measuring device;

transferring the temperature measured at the two places from the dummy substrate to the connection parts via the terminal of the dummy substrate;

calculating a temperature distribution of temperature measurements taken along the transfer route; and controlling temperature along the transfer route on the basis of the temperature distribution calculated.

2. A method of measuring temperature in a pattern drawing apparatus comprising:

a drawing chamber for drawing a pattern on a substrate;

a stage within the drawing chamber;

a standby chamber connected to the drawing chamber;

a thermostatic device within the standby chamber; and a connection part located at two places along a transfer route within the pattern drawing apparatus;

the method comprising:

transferring a dummy substrate comprising a temperature measuring device and a terminal connected to the temperature measuring device into the thermostatic device;

transferring of the dummy substrate from the thermostatic device to the drawing chamber while pausing at the two places along the transfer route, the two places comprising in the thermostatic device and on the stage;

measuring the temperature of the dummy substrate at the two places using the temperature measuring device;

transferring the temperature measured at the two places from the dummy substrate to the connection parts via the terminal of the dummy substrate;

calculating a temperature distribution of the temperatures taken along the transfer route;

generating a correction value of pattern drawing data on the basis of the temperature distribution; and transferring the correction value of pattern drawing data to the pattern drawing apparatus.

* * * * *